C. A. LINDSTRÖM AND J. F. STREIB.
DUMP CAR CONSTRUCTION.
APPLICATION FILED JUNE 9, 1915.

1,321,928.

Patented Nov. 18, 1919.
9 SHEETS—SHEET 1.

Witnesses
Frank E. Miller
Margaret Summerell

Inventor
Charles A. Lindström,
John F. Streib
by G. C. Laube,
Attorney

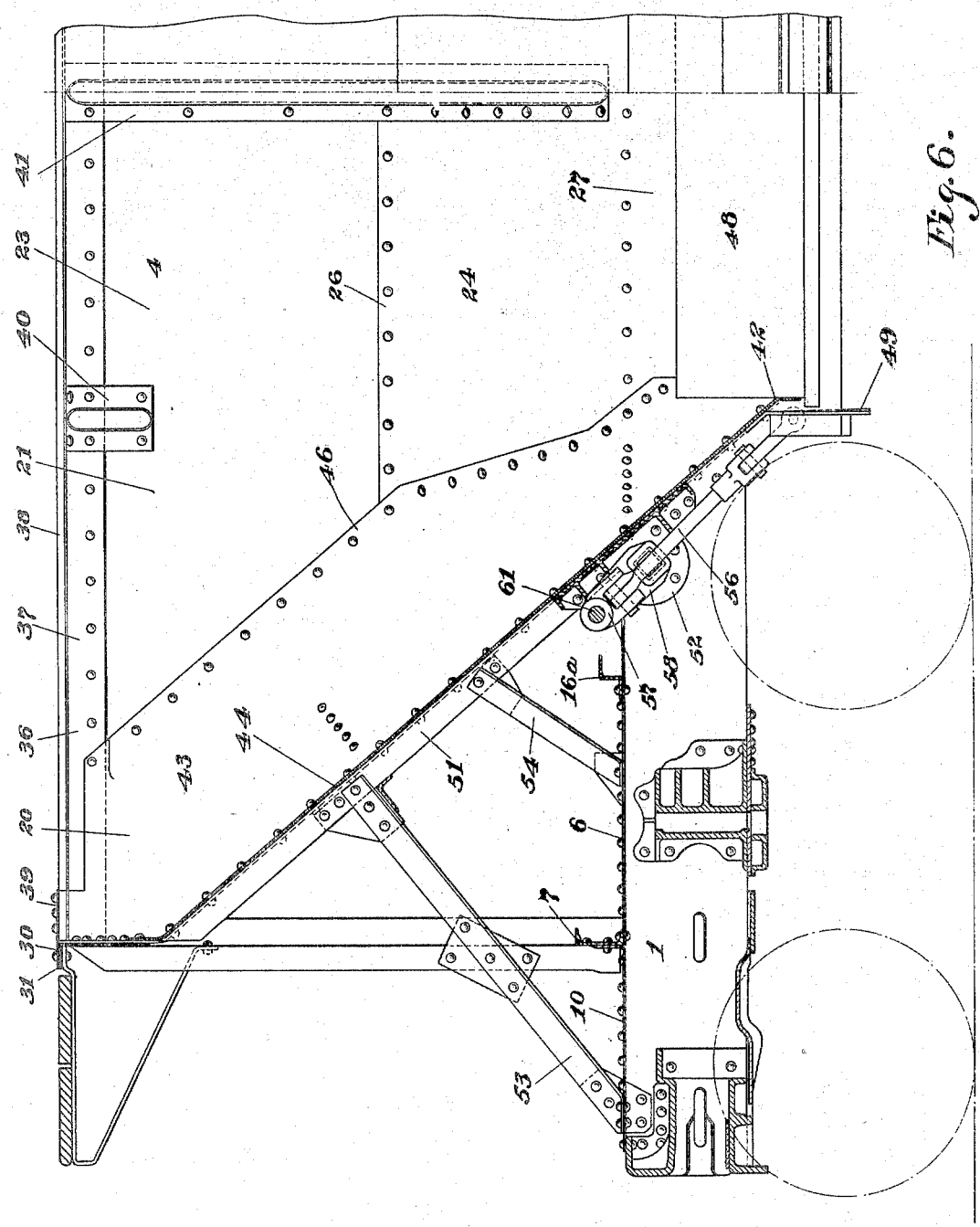

C. A. LINDSTRÖM AND J. F. STREIB.
DUMP CAR CONSTRUCTION.
APPLICATION FILED JUNE 9, 1915.
1,321,928.
Patented Nov. 18, 1919.
9 SHEETS—SHEET 7.
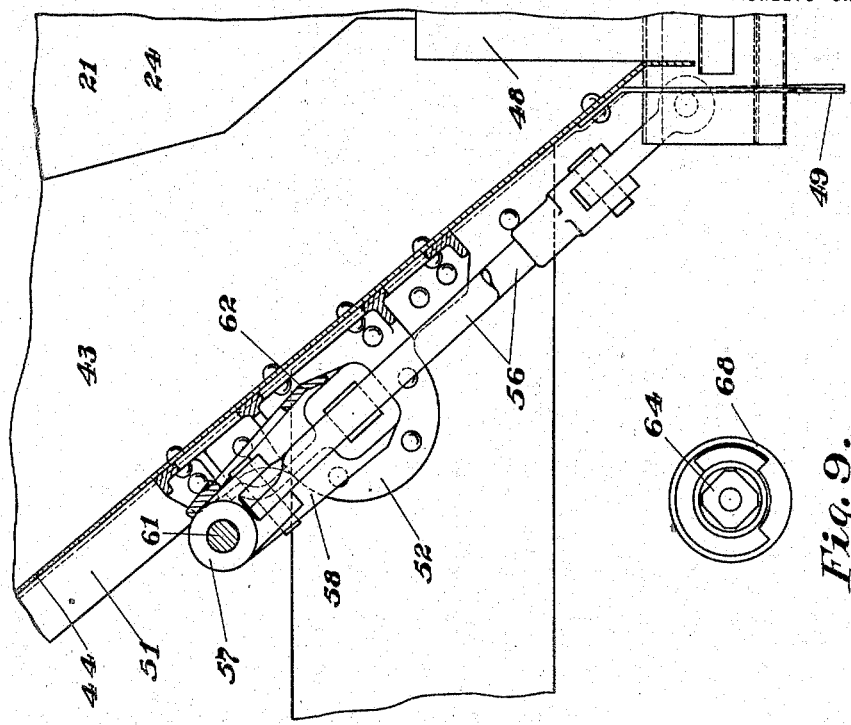
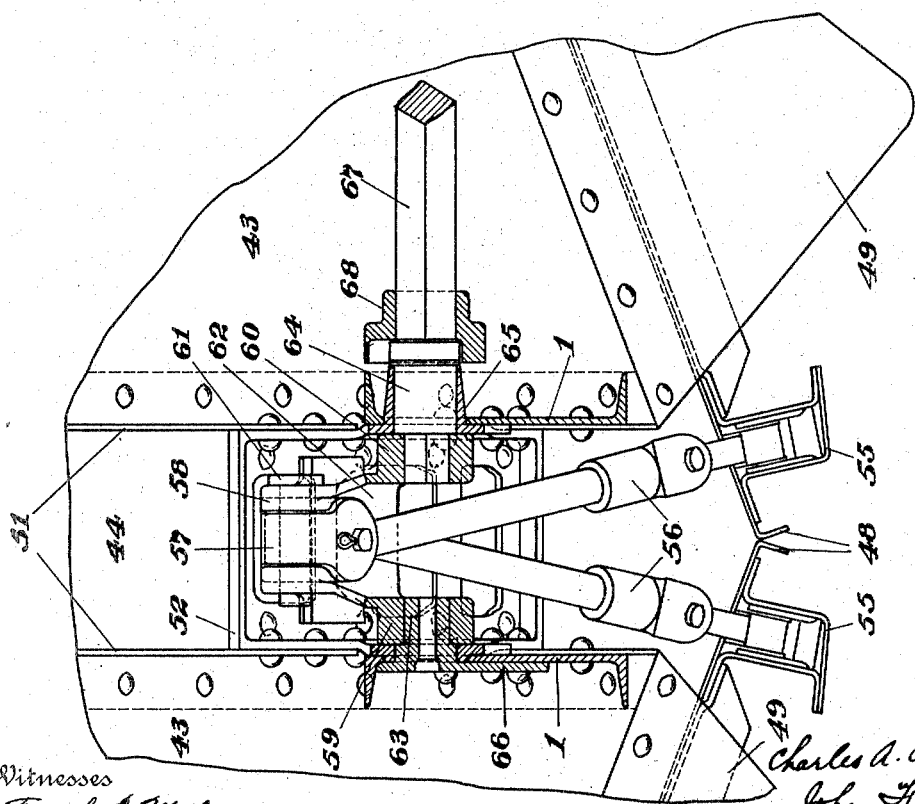

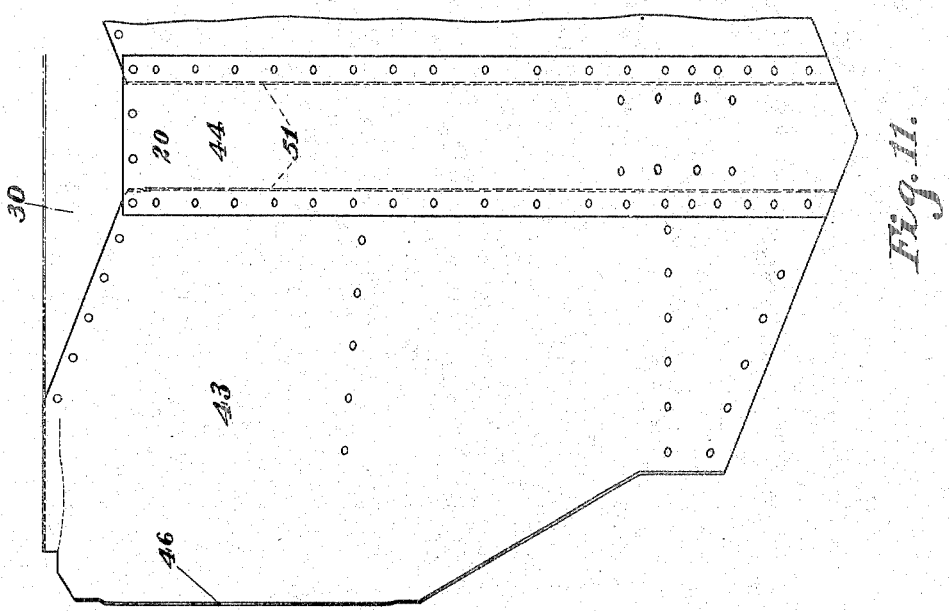
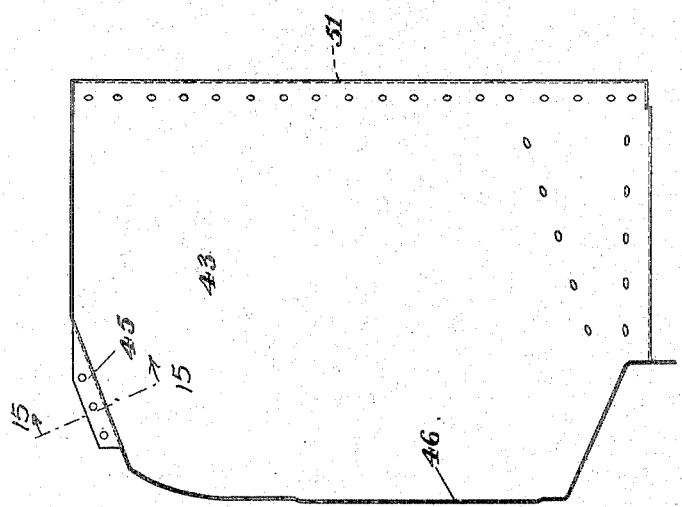

UNITED STATES PATENT OFFICE.

CHARLES A. LINDSTRÖM AND JOHN F. STREIB, OF PITTSBURGH, PENNSYLVANIA, ASSIGNORS TO PRESSED STEEL CAR COMPANY, OF PITTSBURGH, PENNSYLVANIA, A CORPORATION OF NEW JERSEY.

DUMP-CAR CONSTRUCTION.

1,321,928.  Specification of Letters Patent.  Patented Nov. 18, 1919.

Application filed June 9, 1915. Serial No. 33,027.

*To all whom it may concern:*

Be it known that we, CHARLES A. LINDSTRÖM and JOHN F. STREIB, citizens of the United States, residing at #138 Stratford Ave., Pittsburgh, and #739 Taylor Ave., Avalon, respectively, in the county of Allegheny and State of Pennsylvania, have invented certain new and useful Improvements in Dump-Car Construction, of which the following is a specification.

The present invention relates to improvements in dumping cars and door gears therefor.

One of the objects of our invention is to provide a dumping car having a large cubic capacity within certain limiting over-all dimensions of the car.

Another object of our invention is to provide a dumping car having the floor plates so shaped and arranged as to provide a large cubic capacity within certain limiting over-all dimensions and facilitate the complete and rapid discharge of the lading.

Another object of our invention is to provide a center dumping car having a single unobstructed discharge opening with means whereby the lading will be prevented from falling on the rails when being discharged.

Another object of our invention is to provide means for bracing the inwardly projecting legs of the side sheet top members against damage by falling material when the car is being loaded, or from other causes.

Another object of our invention is to provide a dumping car having novel framings at its sides and ends, which framings are rigidly connected together and which are well adapted to take care of the stresses and strains set up in the car.

Another object of our invention is to provide a dump car with an improved door-operating mechanism of the types shown in the Lindström United States Letters Patent Nos. 1,002,856, and 1,012,260.

With the above and other objects in view our invention resides in the construction, arrangements and combinations of parts hereinafter described and claimed.

Figure 1:
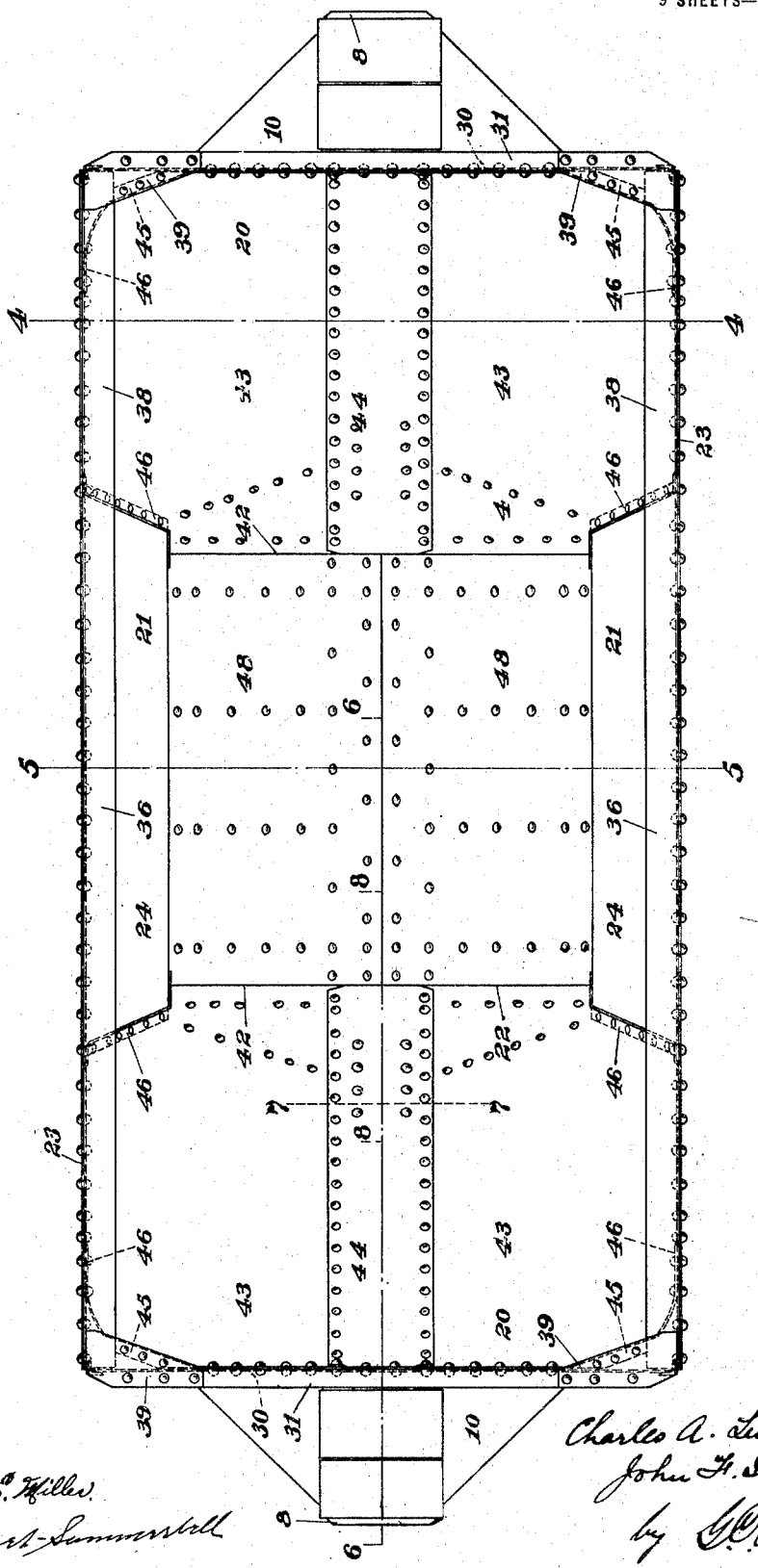
Figure 2:
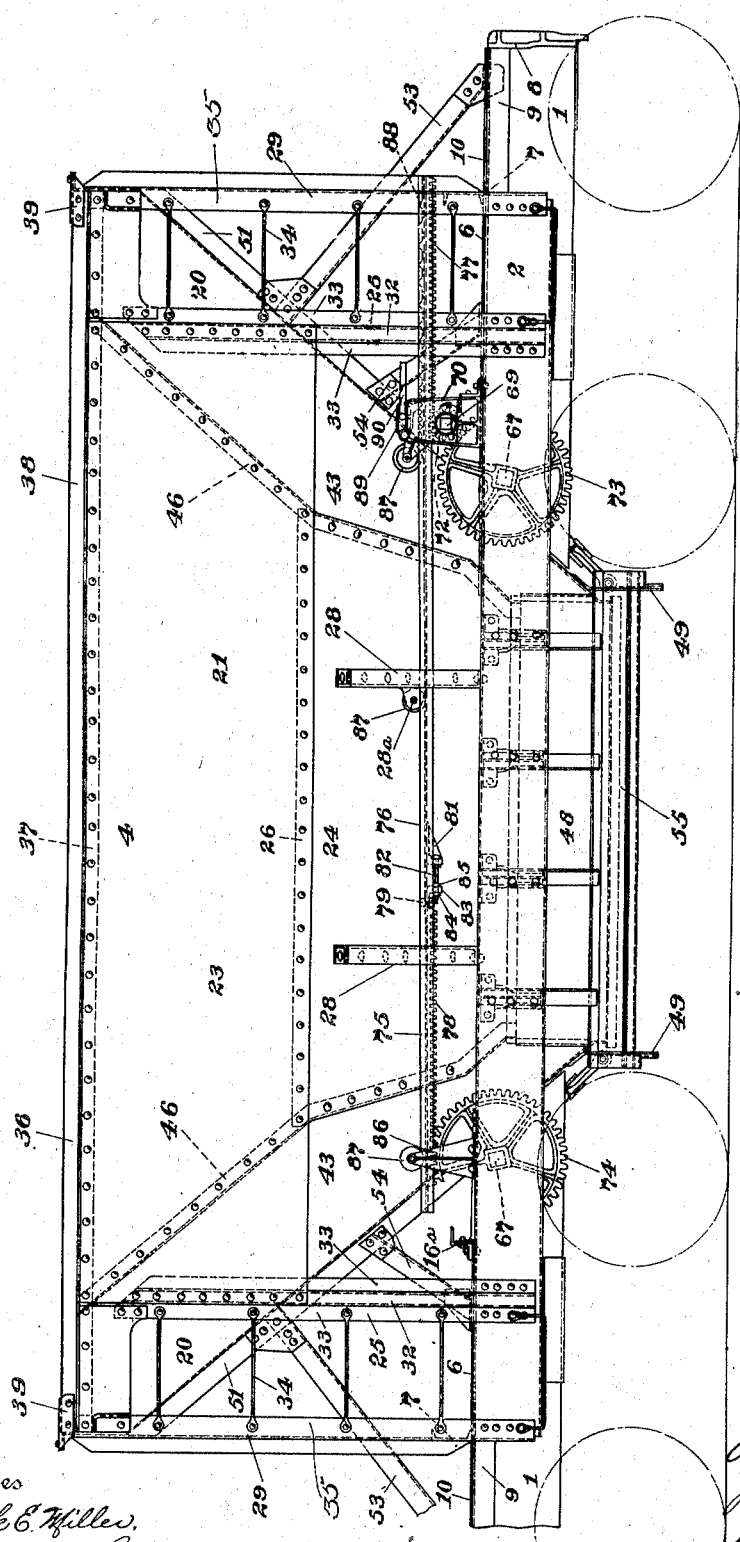
Figure 3:
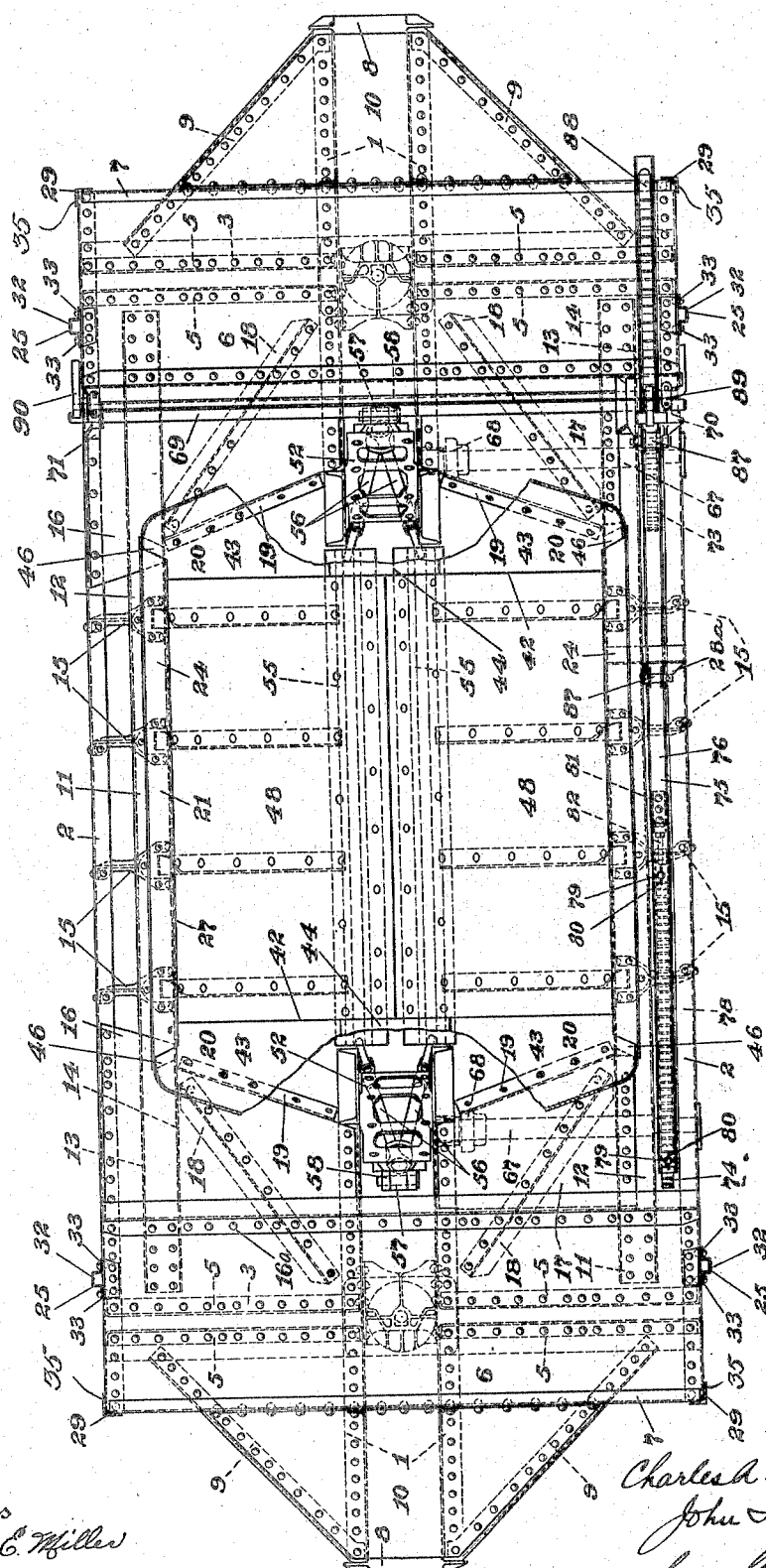
Figure 4:
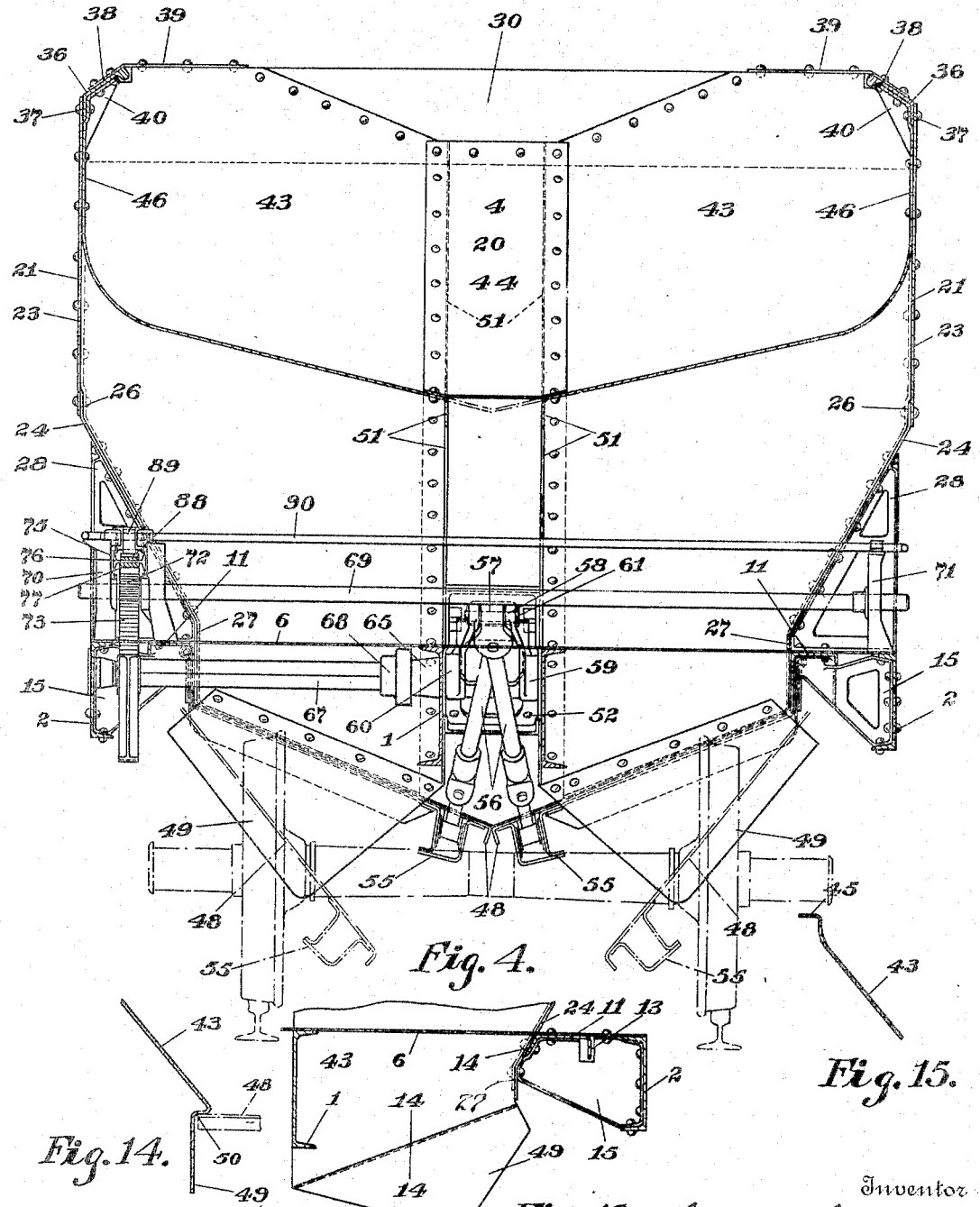
Figure 5:
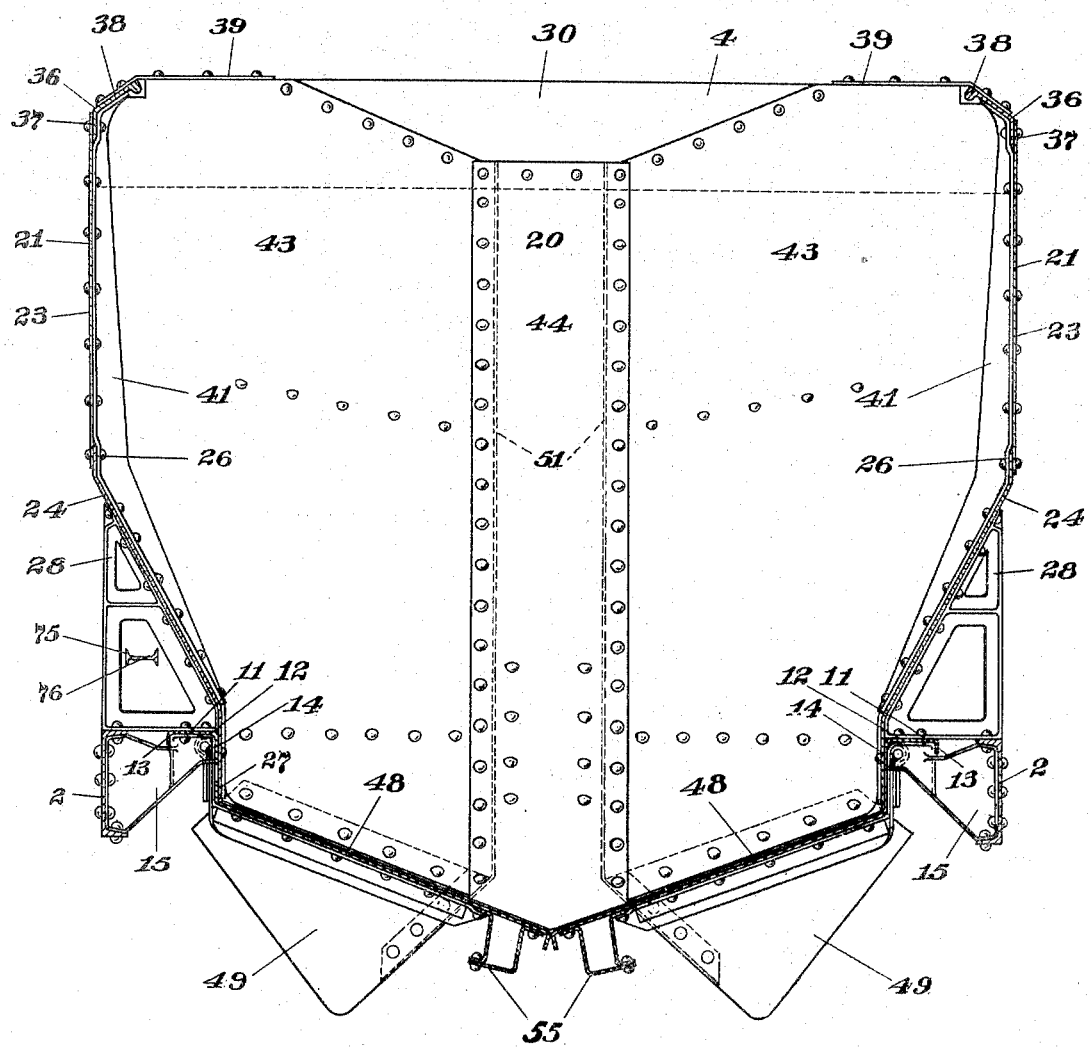
Figure 12:
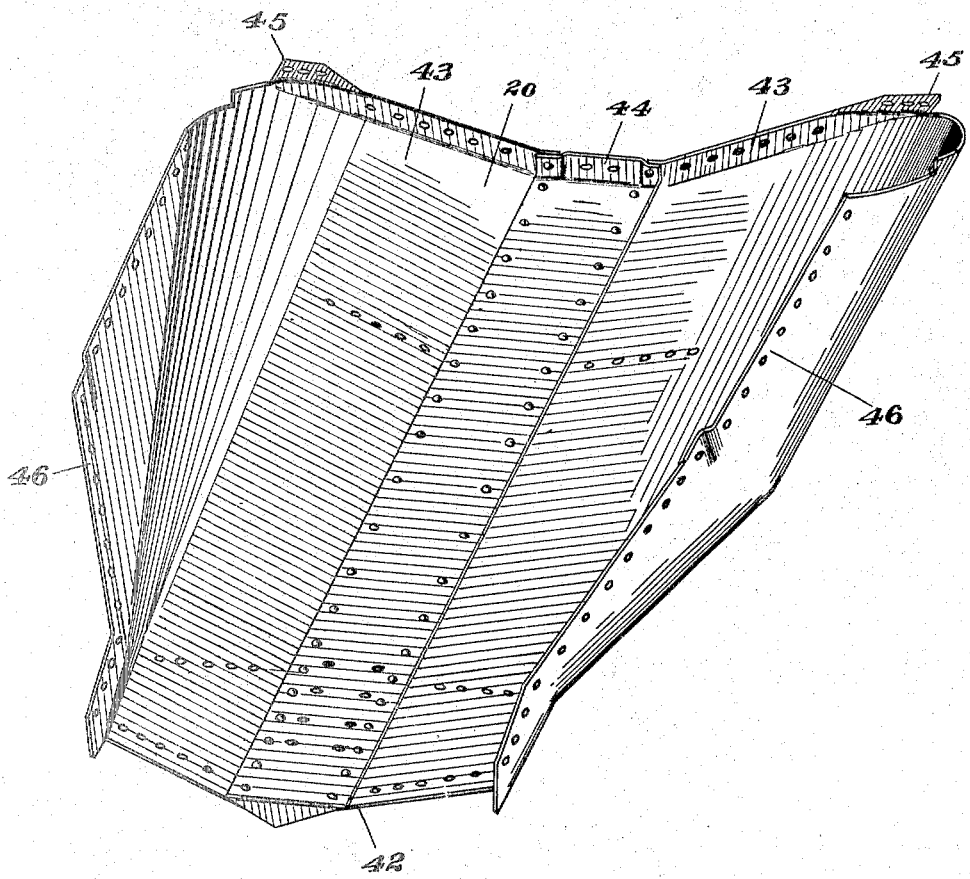

Referring now to the drawings in which like reference characters refer to like parts and in which Figure 1 is a plan view of a car constructed in accordance with the invention, Fig. 2 is a side elevational view of the car; Fig. 3 is a plan view of the car with portions of the sloping end and side floors and the entire side sheets removed; Fig. 4 is an enlarged cross sectional view taken on the line 4—4 of Fig. 1; Fig. 5 is an enlarged cross sectional view taken on the line 5—5 of Fig. 1; Fig. 6 is an enlarged longitudinal sectional view of a portion of the length of the car taken on the line 6—6 of Fig. 1; Fig. 7 is an enlarged cross sectional view taken on the line 7—7 of Fig. 1, parts of the discharge door operating mechanism being removed in order to more clearly show the relation of the various component parts to each other; Fig. 8 is an enlarged detail view taken on the line 8—8 of Fig. 1; Fig. 9 is an enlarged detail view of one of the safety clutches; and Figs. 10, 11 and 12 are enlarged detail plan, part inside elevation and perspective views respectively of one of the sloping end floor sheets. Fig. 13 is a cross sectional view of a portion of a car illustrating modified forms of construction; Fig. 14 is a sectional view taken on the line 14—14 of Fig. 13, and Fig. 15 is a sectional view of one of the sloping end floor plates taken on the line 15—15 of Fig. 10.

Referring now in detail to the drawings 1, 1 indicate the draft sills, 2, 2 the side sills, 3, 3 the bolsters and 4 the car body. Each of the bolsters 3 comprises members 5, 5 which members at their inner ends are secured to the draft sills 1, 1 and at their outer ends are secured to the side sills 2, 2. The side sills 2, 2 are preferably of channel form and may extend from end to end of the car body 4. The side sills 2, 2, draft sills 1, 1 and bolster 3, at each end of the car, are connected together by a member 6 which is preferably in the form of a horizontally extending flat plate, thus forming a strong and rigid end framing. To further strengthen the end framing, a member 7 is provided which extends transversely of the car. This member 7 is preferably secured at its ends to the side sills 2, 2 and intermediate its ends to the draft sills 1, 1, and it may also be secured to the horizontal plate 6. The draft sills 1, 1 extend beyond the member 7 and at their ends are provided with the ordinary striking plate 8 and are braced by diagonal members 9, 9 each of which has one of its ends secured to one of the draft sills, their other ends being secured to the member or plate 6. These sills 1, 1 are further strengthened and braced by a member 10 which is preferably in the form of a flat plate. This member 10 may be a continuation or part of the horizontal plate 6.

11, 11 indicate longitudinally extending members which are preferably of channel form, having their webs 12, 12 disposed in a horizontal direction and their flanges 13, 13 and 14, 14 disposed downwardly in a vertical direction. Each of these members extend preferably parallel with the side sills 2 and is secured to the framing at either end of the car by rivets or other suitable means. At intervals throughout their length each of these members 11 is connected with one of the side sills 2 by the transversely extending members 15 which are preferably of cast metal but if desired may be of pressed or built up construction. At the ends of the car and at one side of the longitudinal center line thereof, plates 16 are provided which are preferably secured to the draft sills 1, side sills 2 and the transverse member 16ª, while on the opposite side of the longitudinal center line, plates 17 are provided which are secured to the draft sills 1, the longitudinally extending member 11 and the transverse member 16ª. Each of these plates 16 and 17 are strengthened by diagonal brace members 18 which are preferably of Z form but which may be of any other suitable form. At their inner edges each of these plates 16 and 17 are provided with flanges 19 which are secured to the sloping end floors, hereinafter more fully described.

The longitudinal members 11 and the side sills 2, when connected in the manner just described, provide a composite or built up side framing construction which is adapted not only to receive and transmit the buffing and pulling strains to which the car is subjected when in use, but also serves to retain the rigidity of the car against the racking strains to which cars of this type are subjected.

The body 4 of the car is of substantially modified V-shape in longitudinal section and comprises sloping end floors 20, 20, and combined side walls and sloping floors 21, 21, some times herein referred to as sloping side floors, which are formed and connected together in such a manner as to permit of the free discharge of the lading through the single central unobstructed discharge opening 22 which is defined by the lower portions of such sloping end floors and combined side walls and sloping floors, and it will be observed that the longitudinal central portion of each end floor is V-shaped in cross-section. This longitudinal central portion is substantially open and unobstructed for its full length, in other words the floor surface or load supporting surface of each end floor is a V-shaped portion which is clear and unobstructed for the full length and breadth of the floor. Because the end floor, and particularly the lower end thereof is an unobstructed V-shape, viz., because the central discharge opening 22 is clear and open for its full length and breadth and because it has no obstructing member extending along or across it, there is enabled to be realized a car which has a larger capacity and which also permits a freer discharge of the lading through the single unobstructed discharge opening 22 than would be realized if the floor construction were not made to embody the features above referred to.

Each of the combined side walls and sloping floors 21 may be made from a single sheet of metal, but for convenience in manufacture they preferably comprise an upper side plate 23 and a lower or sloping floor plate 24. The plate 23 is preferably flat throughout its length and at each of its end portions is connected with one of the posts 25 which may be secured to the side sills 2. The lower or sloping floor plate 24 is inclined downwardly and inwardly toward the longitudinal center line of the car and is provided with an upper flange 26 which is adapted to be secured to the lower portion of the upper plate 23, and is further provided with a lower flange 27 which may be secured to the flange 14 of the member 11, thus stiffening the lower portion of the combined side wall and sloping floor plate against bulging or buckling when the car is loaded with heavy material. We do not wish, however, to be limited to this exact construction for it will be seen from Fig. 13 of the drawings that if desired the sloping portion of the floor plate 24 may be secured to the flange 14 of the member 11 and the flange 27 of the floor plate may be secured to the members 15. To assist in supporting and stiffening the combined side walls and sloping floor plate 21, 21, members 28 are provided which are preferably of triangular form and secured to the longitudinally extending columns, viz., to the side sills 2, 2 and the members 11, 11 thereof, and to the sloping floor plates 24, 24.

At each end of the car body corner posts 29, 29 are provided which, at their lower end portions, are secured to the side sills 2, 2 and to the member 7. The upper end portions of these corner posts are connected together transversely of the car by a plate 30, which forms an end wall of the car body, and is provided with a stiffening flange 31.

Each of the posts 25 is preferably provided with a channel shaped corrugation 32 and with flanges 33, 33 which flanges may be secured to the side sill 2. When these posts 25 are secured to the side sill 2, the corrugations 32 extend outwardly beyond the vertical plane of the side sill and at their upper portion are connected with the side wall sheets 23 by rivets or other suitable means. At the sides of the car and at opposite ends thereof the ordinary ladder irons 34 are provided, each of which is secured to one of the flanges 33, of one of the posts 25 and the flange 35 of one of the posts 29. It will be seen from the foregoing description that the ladder irons 34 when secured to the posts 25 and 29 will be located wholly within the plane of the sheet 23 of the combined side wall and sloping floor plates where they will be, as nearly as possible, free from accidental damage.

36, 36 indicate top members of the car body which are preferably of angular form in cross section, each having a vertically disposed flange 37 and a flange 38 which is preferably inclined. The flange 37 of each member is secured at its end portions to the corner posts 29 and intermediate its ends is secured to the upper portion of the side wall sheet 23. The flange 38 preferably extends in a direction toward the longitudinal center line of the car and at its end portions may be connected with the flange 31 of each end top plate 30 by a gusset member 39. To stiffen and strengthen the flange 38 of the members 36 against damage when the car is being loaded, brace members 40 are provided which may be secured to the under side of the flange 38 and to the side wall sheet 23. To further stiffen and strengthen the combined side walls and sloping floors 21, 21, stakes 41 are provided which are preferably of U-shape in cross section having lateral flanges, which are secured to the plates 23 and 24 by rivets or other suitable means. The upper end portions of these stakes are formed in such a manner as to also form stiffeners or braces for the flanges 37 of the top members 36.

Each of the end floors 20 is gradually depressed from its sides to its lowest portion at or near the longitudinal center line of the car and slopes downwardly and inwardly from the end of the body 4 toward the transverse center line of the car and as indicated at 42, the lower portion of the sloping end floor defines one end of the single central discharge opening 22, which discharge opening is rectangular in horizontal projection or plan. The form and slope of these end floors 20, 20 not only facilitate the free discharge of the lading but also provide for an increase in capacity without increasing the length or width of the car body. Each of these end floors is preferably of substantially V-shape in cross section—take any transverse vertically extending cross-section —and the lower end of the V-shape portions define the ends of the discharge opening 22. Each end of the discharge opening 22 is in plan a straight line that extends transversely and at right angles to a line parallel with the longitudinal center line of the car. Each of the sloping end floors may be made of a single plate, but for convenience in manufacturing may comprise side end floor plates 43, 43 and a center end floor plate 44. The upper portions of the plates 43, 43 at each end of the body 4 are preferably secured to the plate 30 and may be provided with top flanges 45, 45 which may be secured to the gusset member 39. From the plate 30 and the gusset member 39 these end floor plates 43, 43 slope downwardly and inwardly to the discharge opening 22, and at their outer sides are bent in such a manner as to form flanges 46, 46 which are secured to the plates 23 and 24 of the combined side walls and sloping floors 21, 21. These plates 43, 43, besides sloping in a direction longitudinally of the car, also slope in a direction transversely of the car and converge from the combined side walls and sloping floors 21, 21 toward each other, and at their inner portions may be connected together by the center floor plate 44. If desired the plate 44 may be dispensed with and the plates 43, 43 may extend to the longitudinal center line of the car as shown in dot and dash lines Fig. 4 of the drawings and may be secured together in any suitable manner. As indicated at 47 in the drawings, the lower portions of these plates 43, 43 and 44 extend below the combined side walls and sloping floors and define the end edges of the single central unobstructed discharge opening 22. The doors 48, 48 are preferably hinged at the sides of the car to and between the jaws formed in the transverse members 15 and when in closed position said doors are adapted to contact with lower edges of the plates 43, 43. To the lower portions of the plates 43, 43 baffle plates or wings 49, 49 are secured which prevent the escape of the lading past the ends of the rectangular, substantially flat doors 48, 48 when such doors are in an open position. It will be seen that when the lading is being discharged the doors 48, 48 form in effect continuations of the combined side walls and sloping floors 21, 21, and such doors in conjunction with the baffle plates or wings 49, 49 will direct the discharge of the lading wholly within the space between the track rails. It will be noted that the wings 49 are depending triangular-shaped members that extend vertically and transversely of the car. It will also be observed that the triangular-shaped members or plates depend from the sides of the V of the V-shape portions, or in other words, from the lower ends of the central V-shape portions of the sloping end floors. We do not wish to be limited to this exact construction of the lower portions of the sloping end floor plates 43, 43 and baffle plates or wings 49, 49, for it will be seen from Figs. 13 and 14 of the drawings that the baffle plates or wings may be made integral with the floor plates 43, 43. When these baffle plates are made integral with the plates 43, 43, flat surfaces 50, 50 may be provided against which the doors 48, 48 may contact when such doors are in closed position. The inner edge portions of the floor plates 43, 43, at each end of the car, may be provided with outwardly extending stiffening flanges 51, 51.

52, 52 indicate connection members each of which is secured to the draft sills 1, 1, flanges 51, 51 of the sloping end floor plates 43, 43 and to the sloping end floor plate 44, thus forming a connection between the body of the car and the underframe. Besides forming a connection between the body of the car and the underframe, this member also forms a support for portions of the door operating mechanism hereinafter more fully described. The lower portions of the sloping end floor plates are secured to the flanges 19 of the plates 16 and 17 thus providing additional connections between the body and the underframe.

To assist in supporting and bracing the body 4, members 53 and 54 are provided, each of which is preferably of angular form. One end of each of these members is preferably secured to one of the sills 1, and each member extends upwardly and the upper end thereof may be connected with the flange 51 of one of the floor plates 43 by rivets or other suitable means.

For the purpose of operating the doors 48, 48 we have provided a mechanism which is similar to the mechanism shown in U. S. Letters Patent No. 1,002,856 and 1,012,260, granted to Charles A. Lindstrom, with the following improvements: Instead of locating the crank operating mechanism on both sides of the car in such a manner that the mechanism on one side operates one end of each of the doors and the mechanism on the other side operates the other end of each of the doors, in which location they are difficult to inspect without going from side to side of the car, the mechanism has been mounted on one side of the car. This improvement also reduces the number of pinion wheels from two to one, and permits the whole mechanism to be constructed more accessible and compact, and also cheaper.

The present mechanism including parts previously used and the modifications are as follows: Each of the discharge doors 48 is provided with a beam 55, composed of Z or other suitable section or sections extending along and under its free edge and projecting slightly on each end of the door. The ends of beams 55, 55 are connected through the medium of universally jointed links 56 to yokes 57, 57 pivotably mounted in crank frames 58, 58, which are preferably located between the sills 1, 1, and at each end of the doors. That is to say, there is a pair of links 56 at each end of the discharge doors, one end of each of said links being connected to the end of its respective beam 55, the other end of each pair of links being brought together and pivotally mounted in the yoke 57. Each of the crank frames which are oppositely disposed consists of a pair of crank arms 59, 60 connected together through the medium of a web 62. At the free ends of the crank arm there is carried the crank pins 61 upon which the yokes 57 are directly mounted. Each of the crank frames 58 is journaled, as later described, in the draft sills 1, 1 in such a position that when the discharge doors 48, 48 are closed, the links 56 and yoke 57 are on the dead center of the crank frame 58, or slightly beyond the same toward the sloping floor, so that the load on the doors tends to force the crank frame in the closing direction and thus the doors are automatically locked against opening from jars or shocks during transit. It will be noted from the drawings that the crank frames 58 are oppositely disposed so that through the medium of the yokes 57 and the links 56 they oppose each other, which arrangement is a further safe-guard against accidental opening of the doors during transit.

The arms 59 of the crank frames 58 are journaled on trunnions 63, while the arms 60 are provided with trunnions 64 having cylindrical outer bearing portions which are suitably journaled in bearing members 65 preferably integral with the members 52 secured between the sills 1, 1. Each of these trunnions is provided with a squared inner end which fits in a square perforation in the crank arm 60 and may form a member of the safety clutch hereinafter referred to. Trunnions 63 are each provided with a flange 66 which is preferably secured to the outer face of the sill 1.

For operating the crank frames 58, shafts 67 are provided which are secured in the outer portions of the clutches hereinafter described by any suitable means. The shafts 67 extend transversely from the clutches to the side of the car, and are supported at their outer ends by suitable bearings. Near the outer ends of the shafts 67, segments of gears are secured thereto, connected with rack operating mechanism hereinafter described.

Safety clutches are introduced for the purpose of permitting the dropping of the doors quickly without danger to the operator. The clutch members 68 and the trunnions 64 are provided with projecting lugs, such lugs being in the same rotary plane so that the lug in the clutch member 68 when rotating will strike the lug on the trunnion 64 and transmit motion to such trunnion 64 and, conversely, either the clutch member or the trunnion is capable of limited non-transmitting movement relative to the other. These clutches are of the same general character as described in United States Letters Patent Nos. 865,714, 865,920 and 865,921 granted to Charles A. Lindstrom. It will be noted that the crank frames 58, in dropping the doors will make about one half revolution, and this being the case, because of the interposition of the clutches, such movement will not be transmitted to the shafts 67, and hence will be independent of shafts 67 and the balance of the mechanism.

It is necessary that the two crank frames 58 operate simultaneously to prevent undue strain on either side of a door due to one crank frame operating before the other, also that the two crank frames move away from the end sloping floors when the doors are being opened and toward the floors when the doors are being closed, which enables the placing of the crank frames closer to the floors and also allows the use of straight connections to the beams 55; further, as the load on the doors is naturally great, on account of the size of the doors as well as the nature of the lading, a power increasing mechanism is necessary. For this purpose the two shafts 67 are operatively connected to a common operating shaft 69, preferably extending transversely of the car and journaled in bearings 70 and 71. The shaft 69 is connected to one of the shafts 67 through the medium of a pinion 72 secured on the shaft 69, meshing with a segment gear 73 on the shaft 67, such segment gear projecting upwardly between the side sill 2 and the member 11, and shaft 69 being preferably located above the horizontal plane of the upper surfaces of the side and draft sills. The operating shaft 69 is connected with the other shaft 67 by means of a segment gear 74 on the shaft 67, the pinion 72 on the shaft 69 and toothed racks 75 meshing with and operatively connecting said segment gear 74 and pinion 72.

The rack 75 comprises a member 76 which is preferably of I form having toothed members 77 and 78 attached to its horizontally disposed web in such position as to mesh with the pinion 72 and the segment gear 74 respectively. The toothed member 78 is attached to the web of the member 76 through the medium of bolts 79 which pass through perforations in the member 78 and through slotted perforations 80 in the member 76, such bolts being held in position by nuts or other suitable means. To the member 76, intermediate the members 77 and 78, a bracket 81 is secured. Held within this bracket and extending outwardly therefrom is a threaded member 82 which is adapted to pass through a perforation in the lug 83 of the member 78. This member 82 is provided with nuts 84 and 85 which are adapted to engage the opposite faces of the lug 83 and hold the member 78 in any desired position. When for any reason it is desired to lengthen or shorten the distance between the members 77 and 78 the nuts 84 and 85 are turned to effect such adjustment.

The rack 75 is supported in operative position by means of brackets 86 and 70, projections being provided on the inner sides of the vertical portion of the sides of the brackets, on which slide the side extensions or flanges of the rack. The rack is retained in such a position, that the teeth shall be in mesh with the teeth of the pinion 72 and segment gear 74, by means of rollers 87 which contact with the upper portions of the rack, and which are held in such position by means of pins which are passed through the upward extensions of the brackets 86 and 70. Intermediate the brackets 86 and 70 the rack is retained in position by a roller journaled between the lugs 28$^a$ which are preferably integral with one of the members 28.

For the purpose of holding the shaft 69 against movement when the mechanism is not being operated, a toothed member 88 is provided which is mounted on the rack 75 and which may be engaged by a pawl 89 pivotally mounted on the member 70 above the rack 75. This pawl 89 is adapted to be engaged by a cranked portion of a rod 90 which rod extends preferably from side to side of the car, and which may be operated from either side of the car by means of the cranked ends which are provided.

All of the parts of the mechanism having been described, the operation of the same may be briefly described as follows:—Assuming the doors to be closed and the car to be loaded with ore with the parts in the position as shown in Figs. 2, 3, 4, 6, 7, and 8 of the drawings, the operator grasps the rod 90 by one of its cranked ends and through its operation throws the pawl 89 out of engagement with the toothed member 88. A crank or wrench is then applied to the end of the shaft 69, which is then operated in the direction of the arrow, as shown in Fig. 2. This results in turning one of the shafts 67 in the same direction, and the other of the shafts 67, i. e., the shaft geared directly to the shaft 69, in an opposite direction to the direction of rotation of the shaft 69. As the shafts 67 rotate, the lugs on their clutch members strike the lugs on the trunnions 64 which turn with the crank frame 58, whereupon the crank frames 58 are turned and the links 56, yokes 57 and crank frames 58 run away from the shafts 67 for about one-half of a revolution as already described. To close the doors these movements are reversed.

We do not wish to be limited to the exact construction of the framing, body and end floors and discharge door operating mechanism as described in the specifications, for it will be apparent to those skilled in the art to which this invention appertains, that many changes may be made without departing from the spirit and scope of the invention as set forth in the appended claims.

Having thus described the invention, what we claim as new and desire to secure by Letters Patent is:

1. A dump car having sides, sloping end floors each for its full length being substantially V-shape in cross section, the longitudinal central V-shape portion of which is unobstructed throughout its full length, side floor plates connected to said sides, the lower portions of said side floor plates and the lower portions of the floor plates, that provide the sloping end floors, together defining a single unobstructed central discharge opening in the bottom of the car, and doors for closing said opening.

2. A dump car having connected sides and end floors, which end floors slope downwardly and inwardly, and with the sides define a simple unobstructed central discharge opening that is rectangular in plan, the lower end portion of each of the end floors which define the ends of the discharge opening each being substantially V shape, and having an unobstructed central portion.

3. A dump car having connected sides and end floors, the end floors each having, in each half that is outside of the longitudinal central portion of the car, a flat surface that slopes downwardly and inwardly toward the transverse central portion of the car and that slopes upwardly toward the corresponding side of the car, the lower edges of said end floors defining the ends of a single unobstructed discharge opening, the lower edge of each end floor in a transverse vertical view being substantially a V, and the load supporting surfaces at the lower end portion of each end floor being unobstructed.

4. A dump car having connected sides and end floors, the end floors each having a pair of flat surfaces, each of which surfaces slopes downwardly and inwardly toward the transverse central portion of the car and downwardly and inwardly toward the longitudinal central portion of the car, the floor surface at the lower end portion of each end floor being unobstructed and the lower edge of each end floor defining an end of a single central door opening provided in the car, each of which door opening ends are in plan straight lines extending at right angles with a longitudinal center line of the car, that portion of each end floor which defines an edge of the door opening being substantially V-shaped in a transverse vertical view.

5. In a dump car, the combination with the sides and end framing thereof of a body mounted on said framing, said body having side plates with inwardly and downwardly extending side floor plates, and end floors each comprising a pair of end floor plates sloping downwardly and inwardly toward the longitudinal and transverse central portions of the car and a central floor plate connecting said sloping end floor plates, which central floor plate slopes downwardly and inwardly toward said transverse center line, the lower edge portions of said side floor plates and of said sloping end and central floor plates defining a single unobstructed discharge opening in the center of the bottom of the car, the load supporting surfaces along the lower central portion of the end floors being unobstructed whereby the lading is freely discharged when the discharge doors are open.

6. A dump car having a sloping end floor which throughout its length is of substantially V shape in cross section, the longitudinal central portion of said floor, and particularly the lower end thereof, being unobstructed, said floor comprising a plurality of metal plates connected longitudinally along the longitudinal central portion of the car, the lower edges of the sloping end floor forming the end of a single central discharge opening, and a pair of coöperating doors for closing said opening, which doors are substantially flat on the load carrying portion, meet at the longitudinal center of the car and are hinged along the car sides.

7. A dump car having at each end thereof a sloping end floor of substantially V shape in cross section, each of said end floors comprising a plurality of metal plates connected longitudinally along the longitudinal central portion of the car, the lower edges of the V portions of the sloping end floors defining the ends or opposite edges of a single central unobstructed discharge opening, the longitudinal central portion of each end floor being unobstructed whereby a free discharge of the lading is enabled to be realized.

8. A dump car having a single central discharge opening in its bottom, doors for closing said opening, sloping end floors of substantially V shape in cross section, and substantially triangular shaped means depending from the lower ends of the V portions of the sloping end floors, which triangular shaped means extend vertically and transversely of the car and are adapted to prevent lading from falling on the track rails when said doors are in an open position.

9. A dump car having sloping sides, end floors of substantially V shape in cross section connected to said sides and with the sides defining a single central discharge opening in the bottom of the car, doors hinged at the sides of the car for closing said opening, and transversely extending extensions on said V-shape end floors adapted to prevent lading from falling on the track rails when the doors are in an open position.

10. A dump car having sloping sides, end floors having central portions of substantially V shape in cross section and curved side portions connected to said sides, which sloping sides and V shape central portions define a single central discharge opening in the bottom of the car, doors hinged at the sides of the car for closing said opening, and floor extensions depending from said V shape central portions adapted to prevent lading from falling on the track rails when the doors are in open position.

11. A dump car having sloping sides, end floors each of substantially V shape in cross section and unobstructed throughout its length and breadth which end floors are connected to said sloping sides and with said sloping sides defining a single central unobstructed discharge opening in the bottom of the car, and doors hinged at the sides of the car, meeting at the center of the car, and extending from end floor to end floor so as to close said opening.

12. A dump car body having sloping end floors having central portions of substantially V shape in cross section, a single discharge opening in its bottom, substantially triangular shaped plates depending from said V shape central portion adjacent to said opening which triangular plates extend vertically and transversely, and coöperating doors extending from the central portion of one end floor to the central portion of the other end floor for closing said opening, said triangular plates and doors being arranged so as to direct the dumping of the lading.

13. A dump car having sloping end floors with central portions of substantially V shape in cross section, a single discharge opening in its bottom, substantially triangular shaped plates depending from the lower ends of said V shape central portions and located adjacent to said opening, and doors meeting along a longitudinal center of the car for closing said opening, said doors being arranged between said depending plates, extending from end floor to end floor and hinged along the car sides and so that the free ends can swing downwardly and outwardly.

14. A dump car body having sloping end floors having central portions of substantially V shape in cross section and curved side portions, a single discharge opening in its bottom, triangular wing plates depending from said V shape central portions adjacent the ends of said opening, and doors closing said opening, which doors are located between but are arranged to coöperate with said plates.

15. A dump car body having a sloping end floor at each end of the car, the longitudinal central portion of each end floor being substantially V shape in cross section, a discharge opening in the bottom of the car, substantially triangular shaped plates depending from said V shape central portion, which triangular shaped plates are located adjacent the ends of said opening, and doors hinged at the sides of the car body for closing said opening, said doors being adapted to swing between said plates.

16. A dump car body having sloping end floors of substantially V shape in cross section which define the ends of a central discharge opening, transversely extending triangular wing plates each depending from a side of the V of a V shape portion, and each located adjacent an end of said opening, and doors hinged at the sides of the body for closing said opening, said doors being adapted to swing between said plates.

17. A dump car body having sloping end floors with central portions of substantially V shape in cross section, a discharge opening in its bottom, said opening being of greater width than the distance between the track rails, doors hinged at the sides of the body for closing said opening, and substantially triangular shaped plates depending from said V shape central portions adjacent the ends of said doors and extending transversely of the car, said doors, when the latter are in an open position, coöperating with said plates to discharge the lading wholly within the space between the track rails.

18. A dump car having a single discharge opening in its bottom, said opening being of greater width than the distance between the track rails, but of shorter length than the distance between the inner truck wheels, sloping end floors having central portions of substantially V-shape in cross section, doors hinged at the sides of the body for closing said opening, and transversely extending plates depending from the lower V shape central portion of said sloping end floors and located adjacent the ends of said doors, said doors when in an open position coöperating with said plates to discharge the lading wholly within the space between the track rails.

19. A dump car having a substantially V-shape in cross section sloping end floor, said floor having at the lower portion thereof vertically depending portions forming transversely extending baffle plates.

20. A dump car having sloping side and end floors which define a single discharge opening in the bottom of the car, the end floors having central portions of substantially V-shape in cross section and curved side portions, said central V shape portions having transversely extending depending portions, and doors for closing said opening arranged between said depending portions, the construction being such that the sloping sides are connected to the curved side portions of the end floors.

21. A dump car having sloping side and end floors which define a single discharge opening in the bottom of the car, the end floors having central portions of substantially V-shape in cross section and curved side portions, and doors for closing said opening, the construction being such that the sloping sides are connected to the curved side portions of the end floors.

22. A dump car having sloping side floors, sloping end floors with central portions of substantially V-shape in cross section and curved side portions connected to said side floors, which side and end floors define a single discharge opening in the bottom of the car, and doors for closing said opening.

23. A dump car having sloping end floors with central portions of substantially V-shape in cross section and curved side portions, a discharge opening in the bottom of the car, said opening being of greater width than the distance between the track rails, substantially triangular shaped wings depending from said central V shape portions at each end of said opening, and a pair of coöperating doors one hinged at one side of the car and the other hinged at the other side of the car, which doors are adapted to swing between said wings to close said opening.

24. A dump car having sloping side floors and end floors which longitudinally slope downwardly and toward the transverse center line of the car, which said side and end floors define a single unobstructed discharge opening in the bottom of the car, each of said end floors throughout its entire length being gradually depressed toward the longitudinal center line of the car, and also being unobstructed whereby the lower portion of each end floor is in cross-section substantially a V.

25. A dump car having an end floor which slopes longitudinally and which is gradually depressed toward a longitudinal center line of the car, said end floor having vertically and transversely extending depending portions at its lower end.

26. A dump car having sloping side floors and sloping end floors, said end floors comprising companion plates having upwardly extending outer side flanges for connection with said side floors and having depending flanges at their adjacent inner edges, which depending flanges are connected with the framing of the car.

27. A dump car having sloping end floors of substantial V-shape in cross section, each of said floors comprising a pair of sloping floor plates, each floor plate having an upwardly extending flange along its outer edge and a downwardly extending flange along its inner edge.

28. A dump car having sides, end walls, gusset plates connecting said sides and end walls, and sloping end floors having upwardly extending flanges secured to said sides, and horizontal top flanges secured to said gusset plates.

29. In a dump car, the combination of an end wall, a side wall, a sloping end floor having horizontal top flanges, and a gusset plate adapted to connect said walls and flanges together.

30. In a dump car, the combination with the end framing, of side framing secured thereto, said side framing comprising a plurality of parallel channel shaped members having their webs disposed substantially at right angles to each other, transverse members adapted to connect said channel members, and a body extending between and carried by said framings.

31. In a dump car, the combination with the end framings, of side framings connecting said end framings, said side framings each comprising a plurality of parallel double flanged members having their webs disposed at substantially right angles to each other, flanged transverse members adapted to connect said flanged members, and a body carried by said end and side framings, the lower portions of said body extending between said flanged members.

32. A dump car having in combination a horizontally extending plate located at each end of the car, composite side framings each comprising a longitudinally extending member with vertically extending web, and a longitudinally extending member with horizontally extending portion, which longitudinally extending members are connected by transversely extending members so as to form the built-up or composite side framing construction, said longitudinally extending members being located below and secured to the horizontally extending plates, draft sills located below and secured to said horizontally extending plates, bolsters located between and secured to said composite side sills, and a body having sloping end floors secured to said draft sills, and sloping side floors secured to said side framing.

33. A dump car having in combination a horizontally extending plate located at each end of the car, a pair of composite side framings each framing comprising a longitudinally extending member with vertically extending web, and a longitudinally extending member with horizontally extending portion, which longitudinally extending members are connected by transversely extending members so as to form the built-up or composite framing construction which is located at the side of the car, draft sills located below and secured to said horizontally extending plates, bolsters located between and secured to said composite side framings, spaced transversely extending braces or stiffening members located at each end of the car above the horizontally extending plate at each end of the car and secured to the longitudinally extending side framing and draft sills, and a body having sloping end floors secured to said draft sills and sloping side floors secured to said side framing construction.

34. In a dump car, side framing comprising a plurality of channel shaped members having their webs disposed at substantially right angles to each other, means for connecting said members together, and a sloping side floor secured to one of said channel shaped members.

35. In a dump car, a side framing comprising a plurality of connected channel shaped members, the web of one of said members being disposed horizontally and the web of the other of said members being vertically disposed, and a sloping side floor secured to one of said channel shaped members.

36. In a dump car, a side framing comprising a plurality of channel shaped members having their webs disposed at substantially right angles to each other, transverse members connecting said channel shaped members and a discharge door hinged to said transverse members.

37. In a dump car, a side framing comprising a plurality of members having webs disposed at substantially right angles to each other, and transverse members, secured to and connecting the webs of said members, and a discharge door hinged to said transverse members.

38. In a dump car, a side framing comprising a plurality of longitudinally extending channel shaped members having their webs disposed at substantially right angles to each other, transverse members secured to the webs of said channel shaped members and a discharge door hinged to said transverse members.

In testimony whereof we affix our signatures in presence of two witnesses.

CHARLES A. LINDSTRÖM.
JOHN F. STREIB.

Witnesses:
FRANK E. MILLER,
MARGARET SUMMERBELL.